US009446397B2

(12) United States Patent
Gamoras et al.

(10) Patent No.: US 9,446,397 B2
(45) Date of Patent: Sep. 20, 2016

(54) METHOD FOR ISOLATION OF NANOMATERIALS

(71) Applicant: Siluria Technologies, Inc., San Francisco, CA (US)

(72) Inventors: Joel Gamoras, Vallejo, CA (US); Fabio R. Zurcher, Brisbane, CA (US)

(73) Assignee: Siluria Technologies, Inc., San Francisco, CA (US)

( * ) Notice: Subject to any disclaimer, the term of this patent is extended or adjusted under 35 U.S.C. 154(b) by 417 days.

(21) Appl. No.: 13/757,036

(22) Filed: Feb. 1, 2013

(65) Prior Publication Data

US 2013/0253248 A1 Sep. 26, 2013

Related U.S. Application Data

(60) Provisional application No. 61/594,883, filed on Feb. 3, 2012.

(51) Int. Cl.
*B01D 25/28* (2006.01)
*C01B 31/02* (2006.01)
(Continued)

(52) U.S. Cl.
CPC .......... *B01J 37/009* (2013.01); *B01D 25/282* (2013.01); *B01D 25/284* (2013.01); *B01J 35/06* (2013.01); *C01B 31/026* (2013.01); *C01B 31/0253* (2013.01); *C01B 31/0293* (2013.01); *B82Y 40/00* (2013.01)

(58) Field of Classification Search
CPC .......... B30B 9/00; B30B 9/26; B30B 13/00; B01D 25/12; B01D 25/28; B01D 25/281; B01D 25/32; B01D 25/125; B01D 33/58; B01D 37/00; B01D 37/02; B01D 2221/00; B01D 25/282; B01D 25/284; B01D 29/76; B01D 29/78; B01D 33/60; B01J 37/02; B01J 37/0201; B01J 37/024; B01J 37/12; B01J 37/14; B01J 37/009; B01J 35/02; B01J 35/06; B01J 35/10; B01J 15/005; B01J 2219/00846; B01J 2219/2429; B01J 2219/30408; B01J 2219/30475; C10G 17/00; C10G 23/00; C10G 23/04; C10G 23/043; C10G 23/047; C10G 23/0475; C10G 23/053; C10G 99/006; B82Y 40/00; B82Y 30/00; B82Y 99/00; C01B 31/02; C01B 31/0206; C01B 31/0213; C01B 31/023; C01B 31/0253; C01B 31/026; C01B 31/0293
USPC ....... 210/767, 768, 769, 773, 780, 791, 797, 210/805, 808, 770–772; 585/500, 906; 977/762, 765, 840, 882, 895, 932; 100/35, 70, 70 R, 71, 72, 73, 90; 502/100, 102, 104, 111, 300; 423/460, 423/445 B, 3, 21.1, 69, 461, 592.1, 593.1, 423/598.6, 608, 610
See application file for complete search history.

(56) References Cited

U.S. PATENT DOCUMENTS 3,413,817 A 12/1968 Ludwig
3,596,473 A 8/1971 Streich
(Continued)

FOREIGN PATENT DOCUMENTS

CN 1073891 A 7/1993
CN 1389293 A 1/2003
(Continued)

OTHER PUBLICATIONS

Publication: Krishnadas et al, "Pristine and Hybrid Nickel Nanowires: Template-, Magnetic Field-, and Surfactant-Free Wet Chemical Synthesis and Raman Studies", The Journal of Physical Chemistry, Published Feb. 25, 2011, pp. 4483-4490.*

(Continued)

*Primary Examiner* — Joseph Drodge
(74) *Attorney, Agent, or Firm* — Seed IP Law Group PLLC (57) ABSTRACT

Methods for isolation and/or purification of nanomaterials, such as nanowires, are provided. The disclosed methods include isolation of nanomaterials via a filter press and are amenable to large-scale production of nanomaterials. Related methods for isolation, purification and/or doping of nanomaterials are also provided.

31 Claims, 3 Drawing Sheets

(51) Int. Cl.
  *B82Y 40/00* (2011.01)
  *B01D 37/00* (2006.01)
  *B01J 37/00* (2006.01)
  *B01J 35/06* (2006.01)

(56) References Cited

U.S. PATENT DOCUMENTS

| | | |
|---|---|---|
| 4,105,641 A | 8/1978 | Buysch et al. |
| 4,140,504 A | 2/1979 | Campbell et al. |
| 4,375,566 A | 3/1983 | Kawamata et al. |
| 4,554,395 A | 11/1985 | Jones et al. |
| 4,629,718 A | 12/1986 | Jones et al. |
| 4,751,336 A | 6/1988 | Jezl et al. |
| 4,754,091 A | 6/1988 | Jezl et al. |
| 4,754,093 A | 6/1988 | Jezl et al. |
| 4,777,313 A | 10/1988 | Sofranko et al. |
| 4,780,449 A | 10/1988 | Hicks |
| 4,814,539 A | 3/1989 | Jezl et al. |
| 4,844,803 A * | 7/1989 | Urech et al. ............ 210/225 |
| 4,849,571 A | 7/1989 | Gaffney |
| 4,895,823 A | 1/1990 | Kolts et al. |
| 4,900,347 A | 2/1990 | McCue et al. |
| 4,939,311 A | 7/1990 | Washecheck et al. |
| 4,939,312 A | 7/1990 | Baerns et al. |
| 4,962,252 A | 10/1990 | Wade |
| 5,012,028 A | 4/1991 | Gupta et al. |
| 5,024,984 A | 6/1991 | Kaminsky et al. |
| 5,041,405 A | 8/1991 | Lunsford et al. |
| 5,073,662 A | 12/1991 | Olbrich |
| 5,080,872 A | 1/1992 | Jezl et al. |
| 5,118,898 A | 6/1992 | Tyler et al. |
| 5,132,472 A | 7/1992 | Durante et al. |
| 5,134,103 A | 7/1992 | Lowery et al. |
| 5,137,862 A | 8/1992 | Mackrodt et al. |
| 5,179,056 A | 1/1993 | Bartley |
| 5,196,634 A | 3/1993 | Washecheck et al. |
| 5,198,596 A | 3/1993 | Kaminsky et al. |
| 5,263,998 A | 11/1993 | Mackrodt et al. |
| 5,306,854 A | 4/1994 | Choudhary et al. |
| 5,312,795 A | 5/1994 | Kaminsky et al. |
| 5,316,995 A | 5/1994 | Kaminsky et al. |
| 5,328,883 A | 7/1994 | Washecheck et al. |
| 5,336,825 A | 8/1994 | Choudhary et al. |
| 5,336,826 A | 8/1994 | Brophy et al. |
| 5,371,306 A | 12/1994 | Woo et al. |
| 5,414,157 A | 5/1995 | Durante et al. |
| 5,500,149 A | 3/1996 | Green et al. |
| 5,523,493 A | 6/1996 | Cameron et al. |
| 5,599,510 A | 2/1997 | Kaminsky et al. |
| 5,659,090 A | 8/1997 | Cameron et al. |
| 5,670,442 A | 9/1997 | Fornasari et al. |
| RE35,632 E | 10/1997 | Leyshon |
| RE35,633 E | 10/1997 | Leyshon |
| 5,712,217 A | 1/1998 | Choudhary et al. |
| 5,714,657 A | 2/1998 | deVries |
| 5,715,657 A | 2/1998 | Mondani et al. |
| 5,736,107 A | 4/1998 | Inomata et al. |
| 5,744,015 A | 4/1998 | Mazanec et al. |
| 5,749,937 A | 5/1998 | Detering et al. |
| 5,750,821 A | 5/1998 | Inomata et al. |
| 5,763,722 A | 6/1998 | Vic et al. |
| 5,817,904 A | 10/1998 | Vic et al. |
| 5,830,822 A | 11/1998 | Euzen |
| 5,849,973 A | 12/1998 | Van Der Vaart |
| 5,866,737 A | 2/1999 | Hagemeyer et al. |
| 5,897,945 A | 4/1999 | Lieber et al. |
| 5,917,136 A | 6/1999 | Gaffney et al. |
| 5,935,293 A | 8/1999 | Detering et al. |
| 5,935,897 A | 8/1999 | Trubenbach et al. |
| 5,935,898 A | 8/1999 | Trubenbach et al. |
| 5,936,135 A | 8/1999 | Choudhary et al. |
| 5,959,170 A | 9/1999 | Withers |
| 5,968,866 A | 10/1999 | Wu |
| 6,020,533 A | 2/2000 | Lewis et al. |
| 6,037,298 A | 3/2000 | Hagen et al. |
| 6,087,545 A | 7/2000 | Choudhary et al. |
| 6,096,934 A | 8/2000 | Rekoske |
| 6,110,979 A | 8/2000 | Nataraj et al. |
| 6,114,400 A | 9/2000 | Nataraj et al. |
| 6,146,549 A | 11/2000 | Mackay et al. |
| 6,153,149 A | 11/2000 | Rabitz et al. |
| 6,158,149 A | 12/2000 | Rudy |
| 6,355,093 B1 | 3/2002 | Schwartz et al. |
| 6,403,523 B1 | 6/2002 | Cantrell et al. |
| RE37,853 E | 9/2002 | Detering et al. |
| 6,447,745 B1 | 9/2002 | Feeley et al. |
| 6,518,218 B1 | 2/2003 | Sun et al. |
| 6,518,476 B1 | 2/2003 | Culp et al. |
| 6,521,806 B1 | 2/2003 | Tamura et al. |
| 6,521,808 B1 | 2/2003 | Ozkan et al. |
| 6,576,803 B2 | 6/2003 | Cantrell et al. |
| 6,596,912 B1 | 7/2003 | Lunsford et al. |
| 6,610,124 B1 | 8/2003 | Dolan et al. |
| 6,696,388 B2 | 2/2004 | Kourtakis et al. |
| 6,726,850 B1 | 4/2004 | Reyes et al. |
| 6,730,808 B2 | 5/2004 | Bitterlich et al. |
| 6,747,066 B2 | 6/2004 | Wang et al. |
| 6,761,838 B2 | 7/2004 | Zeng et al. |
| 6,764,602 B2 | 7/2004 | Shutt et al. |
| 6,800,702 B2 | 10/2004 | Wass |
| 6,821,500 B2 | 11/2004 | Fincke et al. |
| 7,116,546 B2 | 10/2006 | Chow et al. |
| 7,176,342 B2 | 2/2007 | Bellussi et al. |
| 7,183,451 B2 | 2/2007 | Gattis et al. |
| 7,199,273 B2 | 4/2007 | Molinier et al. |
| 7,208,647 B2 | 4/2007 | Peterson et al. |
| 7,250,543 B2 | 7/2007 | Bagherzadeh et al. |
| 7,291,321 B2 | 11/2007 | Bagherzadeh et al. |
| 7,361,622 B2 | 4/2008 | Benderly et al. |
| 7,396,798 B2 | 7/2008 | Ma et al. |
| 7,414,006 B2 | 8/2008 | McConville et al. |
| 7,438,887 B2 | 10/2008 | Suib et al. |
| 7,452,844 B2 | 11/2008 | Hu et al. |
| 7,473,814 B2 | 1/2009 | Basset et al. |
| 7,566,440 B2 | 7/2009 | Lim et al. |
| 7,576,030 B2 | 8/2009 | Benderly |
| 7,576,296 B2 | 8/2009 | Fincke et al. |
| 7,585,812 B2 | 9/2009 | Hu et al. |
| 7,589,246 B2 | 9/2009 | Iaccino et al. |
| 7,619,290 B2 | 11/2009 | Lieber et al. |
| 7,659,437 B2 | 2/2010 | Iaccino et al. |
| 7,667,085 B2 | 2/2010 | Gattis et al. |
| 7,683,227 B2 | 3/2010 | Iaccino et al. |
| 7,687,041 B2 | 3/2010 | Singh |
| 7,728,186 B2 | 6/2010 | Iaccino et al. |
| 7,781,636 B2 | 8/2010 | Iaccino et al. |
| 7,795,490 B2 | 9/2010 | Iaccino et al. |
| 7,829,749 B2 | 11/2010 | Gao et al. |
| 7,867,938 B2 | 1/2011 | De et al. |
| 7,868,243 B2 | 1/2011 | Plissonnier et al. |
| 7,879,119 B2 | 2/2011 | Abughazaleh et al. |
| 7,902,113 B2 | 3/2011 | Zarrinpashne et al. |
| 7,910,670 B2 | 3/2011 | Knudsen et al. |
| 7,915,461 B2 | 3/2011 | Gattis et al. |
| 7,915,462 B2 | 3/2011 | Gattis et al. |
| 7,915,463 B2 | 3/2011 | Gattis et al. |
| 7,915,464 B2 | 3/2011 | Gattis et al. |
| 7,915,465 B2 | 3/2011 | Gattis et al. |
| 7,915,466 B2 | 3/2011 | Gattis et al. |
| 7,932,296 B2 | 4/2011 | Malhotra et al. |
| 7,932,311 B2 | 4/2011 | Aymonier et al. |
| 7,943,106 B2 | 5/2011 | Robinson |
| 7,968,020 B2 | 6/2011 | Behelfer et al. |
| 7,968,759 B2 | 6/2011 | Iaccino et al. |
| 7,977,519 B2 | 7/2011 | Iaccino et al. |
| 8,039,681 B2 | 10/2011 | Krusic et al. |
| 8,071,498 B2 | 12/2011 | Aono et al. |
| 8,071,836 B2 | 12/2011 | Butler |
| 8,129,305 B2 | 3/2012 | Bagherzadeh et al. |
| 8,277,525 B2 | 10/2012 | Dalton |
| 8,293,805 B2 | 10/2012 | Khan et al. |
| 8,399,527 B1 | 3/2013 | Brown et al. |
| 8,399,726 B2 | 3/2013 | Chinta et al. |
| 8,435,920 B2 | 5/2013 | White et al. |

(56) References Cited

U.S. PATENT DOCUMENTS

| | | |
|---|---|---|
| 8,450,546 B2 | 5/2013 | Chinta et al. |
| 8,552,236 B2 | 10/2013 | Iaccino |
| 8,647,999 B2 | 2/2014 | Hayashi et al. |
| 8,669,171 B2 | 3/2014 | Perraud et al. |
| 8,710,286 B2 | 4/2014 | Butler |
| 8,729,328 B2 | 5/2014 | Chinta et al. |
| 8,759,598 B2 | 6/2014 | Hayashi et al. |
| 8,796,497 B2 | 8/2014 | Chinta et al. |
| 8,911,834 B2 | 12/2014 | Aktas et al. |
| 8,912,381 B2 | 12/2014 | Chinta et al. |
| 8,932,781 B2 | 1/2015 | Yang et al. |
| 9,040,762 B2 | 5/2015 | Cizeron et al. |
| 2001/0044520 A1 | 11/2001 | Suzuki et al. |
| 2003/0135971 A1 | 7/2003 | Liberman et al. |
| 2003/0189202 A1 | 10/2003 | Li et al. |
| 2003/0207984 A1 | 11/2003 | Ding et al. |
| 2003/0233019 A1 | 12/2003 | Sherwood |
| 2004/0220053 A1 | 11/2004 | Bagherzadeh et al. |
| 2005/0065391 A1 | 3/2005 | Gattis et al. |
| 2005/0199559 A1* | 9/2005 | Duby ............... 210/770 |
| 2005/0221083 A1* | 10/2005 | Belcher et al. ........ 428/364 |
| 2005/0255993 A1 | 11/2005 | Tanaka et al. |
| 2006/0135838 A1 | 6/2006 | Bagherzadeh et al. |
| 2006/0155157 A1 | 7/2006 | Zarrinpashne et al. |
| 2006/0283780 A1 | 12/2006 | Spivey et al. |
| 2006/0284162 A1 | 12/2006 | Kurt et al. |
| 2007/0027030 A1 | 2/2007 | Cheung et al. |
| 2007/0043181 A1 | 2/2007 | Knudsen et al. |
| 2007/0073083 A1 | 3/2007 | Sunley |
| 2007/0083073 A1 | 4/2007 | Bagherzadeh et al. |
| 2007/0095445 A1 | 5/2007 | Gangopadhyay et al. |
| 2007/0138082 A1* | 6/2007 | Connors et al. ...... 210/321.84 |
| 2007/0158611 A1* | 7/2007 | Oldenburg .......... 252/71 |
| 2008/0051279 A1 | 2/2008 | Klett et al. |
| 2008/0141713 A1 | 6/2008 | Verma |
| 2008/0267852 A1 | 10/2008 | Schumacher et al. |
| 2008/0275143 A1 | 11/2008 | Malhotra et al. |
| 2008/0279744 A1 | 11/2008 | Robinson |
| 2008/0281136 A1 | 11/2008 | Bagherzadeh et al. |
| 2008/0293980 A1 | 11/2008 | Kiesslich et al. |
| 2008/0318044 A1* | 12/2008 | Tian et al. ........... 428/401 |
| 2009/0043141 A1 | 2/2009 | Mazanec et al. |
| 2009/0087496 A1 | 4/2009 | Katusic et al. |
| 2009/0202427 A1 | 8/2009 | Katusic et al. |
| 2009/0259076 A1 | 10/2009 | Simmons et al. |
| 2009/0267852 A1 | 10/2009 | Tahmisian, Jr. et al. |
| 2010/0000153 A1 | 1/2010 | Kurkjian et al. |
| 2010/0003179 A1 | 1/2010 | Katusic et al. |
| 2010/0173070 A1* | 7/2010 | Niu ................. 427/215 |
| 2010/0185034 A1 | 7/2010 | Nishimura et al. |
| 2010/0191031 A1 | 7/2010 | Sundaram |
| 2010/0197482 A1 | 8/2010 | Basset et al. |
| 2010/0200501 A1* | 8/2010 | Hoag et al. ........... 210/620 |
| 2010/0249473 A1 | 9/2010 | Butler |
| 2010/0331174 A1 | 12/2010 | Chinta et al. |
| 2010/0331593 A1 | 12/2010 | Chinta et al. |
| 2010/0331595 A1 | 12/2010 | Chinta et al. |
| 2011/0104588 A1 | 5/2011 | Kwon et al. |
| 2011/0124488 A1* | 5/2011 | Neltner et al. ........... 502/7 |
| 2011/0160508 A1 | 6/2011 | Ma et al. |
| 2011/0171629 A1* | 7/2011 | Swager ............ B82Y 15/00 435/5 |
| 2011/0189559 A1 | 8/2011 | De Miranda et al. |
| 2011/0217544 A1 | 9/2011 | Young et al. |
| 2011/0240926 A1 | 10/2011 | Schellen et al. |
| 2011/0257453 A1 | 10/2011 | Chinta et al. |
| 2011/0275011 A1 | 11/2011 | Zhu et al. |
| 2012/0041246 A1 | 2/2012 | Scher et al. |
| 2012/0065412 A1 | 3/2012 | Abdallah et al. |
| 2012/0116094 A1* | 5/2012 | Swager ............ C01B 31/0213 548/256 |
| 2012/0129690 A1 | 5/2012 | Larcher et al. |
| 2012/0136164 A1 | 5/2012 | Ying et al. |
| 2012/0172648 A1 | 7/2012 | Seebauer |
| 2012/0183770 A1* | 7/2012 | Bosnyak ............ B82Y 30/00 428/367 |
| 2012/0198769 A1 | 8/2012 | Schirrmeister et al. |
| 2012/0204716 A1 | 8/2012 | Schirrmeister et al. |
| 2012/0215045 A1 | 8/2012 | Butler |
| 2012/0222422 A1 | 9/2012 | Nunley et al. |
| 2013/0023709 A1 | 1/2013 | Cizeron et al. |
| 2013/0025201 A1 | 1/2013 | Dalton |
| 2013/0039806 A1* | 2/2013 | Blinn et al. .............. 420/501 |
| 2013/0040806 A1 | 2/2013 | Dismukes et al. |
| 2013/0089739 A1 | 4/2013 | Polshettiwar et al. |
| 2013/0105305 A1 | 5/2013 | Yang et al. |
| 2013/0142707 A1 | 6/2013 | Chinta et al. |
| 2013/0158322 A1 | 6/2013 | Nyce et al. |
| 2013/0165728 A1 | 6/2013 | Zurcher et al. |
| 2013/0178680 A1 | 7/2013 | Ha et al. |
| 2013/0225884 A1 | 8/2013 | Weinberger et al. |
| 2013/0270180 A1 | 10/2013 | Zhang et al. |
| 2014/0050629 A1 | 2/2014 | Masuda et al. |
| 2014/0054516 A1 | 2/2014 | Moon et al. |
| 2014/0080699 A1 | 3/2014 | Ghose et al. |
| 2014/0107385 A1 | 4/2014 | Schammel et al. |
| 2014/0128484 A1 | 5/2014 | Hassan et al. |
| 2014/0128485 A1 | 5/2014 | Hassan et al. |
| 2014/0178788 A1 | 6/2014 | Ha et al. |
| 2014/0194663 A1 | 7/2014 | Butler |
| 2014/0249339 A1 | 9/2014 | Simanzhenkov et al. |
| 2014/0274671 A1 | 9/2014 | Schammel et al. |
| 2014/0332733 A1 | 11/2014 | Joo et al. |
| 2014/0378728 A1 | 12/2014 | Davis et al. |
| 2015/0010467 A1 | 1/2015 | Ito et al. |
| 2015/0087875 A1 | 3/2015 | Zurcher et al. |
| 2015/0224482 A1 | 8/2015 | Cizeron et al. |

FOREIGN PATENT DOCUMENTS

| | | |
|---|---|---|
| CN | 1403375 A | 3/2003 |
| CN | 101224432 A | 7/2008 |
| CN | 101387019 A | 3/2009 |
| CN | 102125825 A | 7/2011 |
| DE | 3406751 A1 | 8/1985 |
| EP | 0 253 522 A2 | 1/1988 |
| EP | 0595425 A1 | 5/1994 |
| EP | 0761307 B1 | 2/2003 |
| EP | 0764467 B1 | 2/2003 |
| EP | 1 632 467 A1 | 3/2006 |
| EP | 1 749 807 A1 | 2/2007 |
| EP | 2287142 A1 | 2/2011 |
| EP | 2374526 A1 | 10/2011 |
| FR | 649429 A | 12/1928 |
| JP | 2005-161225 A | 6/2005 |
| WO | 8607351 A1 | 12/1986 |
| WO | 0016901 A1 | 3/2000 |
| WO | 2004/033488 A2 | 4/2004 |
| WO | 2005/067683 A2 | 7/2005 |
| WO | 2007/130515 A2 | 11/2007 |
| WO | 2008/005055 A2 | 1/2008 |
| WO | 2008/014841 A1 | 2/2008 |
| WO | 2008/022147 A1 | 2/2008 |
| WO | 2008/073143 A2 | 6/2008 |
| WO | 2009/071463 A2 | 6/2009 |
| WO | 2009/115805 A1 | 9/2009 |
| WO | 2010005453 A2 | 1/2010 |
| WO | 2011/050359 A1 | 4/2011 |
| WO | 2011/149996 A2 | 12/2011 |
| WO | 2012/162526 A2 | 11/2012 |
| WO | 2013186789 A1 | 12/2013 |
| WO | 2014043603 A1 | 3/2014 |
| WO | 2014049445 A2 | 4/2014 |

OTHER PUBLICATIONS

Publication: Park et al, "Fabrication of metallic nanowires and nanoribbons using laser interference lithography and shadow lithography", Nanotechnology, vol. 21, published 2010, pp. 1-6.*

Publication: Xuetong Zhang et al, Single-Walled Carbon Nanotube-Based Coaxial Nanowires: Synthesis, Characterization, and Electrical Properties, The Journal of Physical Chemistry, 2005, vol. 109, (3), pp. 1101-1107.*

(56) References Cited

OTHER PUBLICATIONS

"Autothermal Partial Oxidative Coupling of Methane," IP.com, Prior Art Database Technical Disclosure, Jul. 29, 2008, 5 pages.
Cavani et al., "Oxidative dehydrogenation of ethane and propane: How far from commercial implementation?," *Catalysis Today* 127: 113-131, 2007.
Choudhary et al., "Aromatization of dilute ethylene over Ga-modified ZSM-5 type zeolite catalysts," *Microporous and Mesoporous Materials* 47: 253-267, 2001.
Choudhary et al., "Oxidative conversion of methane/natural gas into higher hydrocarbons," *Catalysis Surveys from Asia* 8(1): 15-25, 2004.
Choudhary et al., "Surface Basicity and Acidity of Alkaline Earth-Promoted $La_2O_3$ Catalysts and Their Performance in Oxidative Coupling of Methane," *J. Chem. Technol. Biotechnol.* 72: 125-130, 1998.
Christopher et al., "Engineering Selectivity in Heterogeneous Catalysis: Ag Nanowires as Selective Ethylene Epoxidation Catalysts," *J. Am. Chem. Soc.* 130: 11264-11265, 2008.
Cizeron et al., "Catalysts for Petrochemical Catalysis," U.S. Appl. No. 61/489,651, filed May 24, 2011, 86 pages.
Cizeron et al., "Catalysts for Petrochemical Catalysis," U.S. Appl. No. 61/564,832, filed Nov. 29, 2011, 178 pages.
Cizeron et al., "Catalytic Forms and Formulations," U.S. Appl. No. 13/901,319, filed May 23, 2013, 132 pages.
Débart et al., "α-$MnO_2$ Nanowires: A Catalyst for the $O_2$ Electrode in Rechargeable Lithium Batteries," *Angew. Chem. Int. Ed.* 47: 4521-4524, 2008.
Enger et al., "A review of catalytic partial oxidation of methane to synthesis gas with emphasis on reaction mechanisms over transition metal catalysts," *Applied Catalysis A: General* 346: 1-27, 2008.
Gao et al., "A study on methanol stream reforming to $CO_2$ and $H_2$ over the $La_2CuO_4$ nanofiber catalyst," *Journal of Solid State Chemistry* 181: 7-13, 2008.
Gao et al., "The direct decomposition of NO over the $La_2CuO_4$ nanofiber catalyst," *Journal of Solid State Chemistry* 181: 2804-2807, 2008.
Huang et al., "Exploiting shape effects of $La_2O_3$ nanocrystals for oxidative coupling of methane reaction," *Nanoscale* 5(22): 10844-10848, 2013.
Huang et al., "Exploiting Shape Effects of $La_2O_3$ Nanocrystals for Oxidative Coupling of Methane Reaction," *Nanoscale—Electronic Supplementary Material*, 2013, 7 pages.
Keller et al., "Synthesis of Ethylene via Oxidative Coupling of Methane," *Journal of Catalysis* 73: 9-19, 1982.
Kuang et al., "Grafting of PEG onto lanthanum hydroxide nanowires," *Materials Letters* 62: 4078-4080, 2008.
Labinger, "Oxidative Coupling of Methane: An Inherent Limit to Selectivity?," *Catalysis Letters* 1: 371-376, 1988.
Liu et al., "A novel $Na_2WO_4$-Mn/SiC monolithic foam catalyst with improved thermal properties for the oxidative coupling of methane," *Catalysis Communications* 9: 1302-1306, 2008.
Lunsford, "The Catalytic Oxidative Coupling of Methane," *Angew. Chem. Int. Ed. Engl.* 34: 970-980, 1995.
Neltner et al., "Production of Hydrogen Using Nanocrystalline Protein-Templated Catalysts on M13 Phage," *ACS Nano* 4(6): 3227-3235, 2010.
Neltner, "Hybrid Bio-templated Catalysts," Submitted to the Department of Materials Science and Engineering in partial fulfillment of the requirements for the degree of Doctor of Philosophy in Material Science and Engineering at the Massachusetts Institute of Technology, Jun. 2010, 156 pages.
Nyce et al., "Integrated Processes and Systems for Conversion of Methane to Multiple Higher Hydrocarbon Products," U.S. Appl. No. 14/099,614, filed Dec. 6, 2013, 67 pages.
Nyce et al., "Polymer Templated Nanowire Catalysts," U.S. Appl. No. 61/564,836, filed Nov. 29, 2011, 317 pages.
Pak et al., "Elementary Reactions in the Oxidative Coupling of Methane over Mn/$Na_2WO_4$/$SiO_2$ and Mn/$Na_2WO_4$/MgO Catalysts," *Journal of Catalysts* 179: 222-230, 1998.

Qiu et al., "Steady-state conversion of methane to aromatics in high yields using an integrated recycle reaction system," *Catalysis Letters* 48:11-15, 1997.
Schammel et al., "Catalysts for Petrochemical Catalysis," U.S. Appl. No. 61/794,486, filed Mar. 15, 2013, 217 pages.
Schammel et al., "Oxidative Coupling of Methane Systems and Methods," U.S. Appl. No. 13/900,898, filed May 23, 2013, 201 pages.
Schweer et al., "OCM in a fixed-bed reactor: limits and perspectives," *Catalysis Today* 21: 357-369, 1994.
Somorjai et al., "High technology catalysts towards 100% selectivity—Fabrication, characterization and reaction studies," *Catalysis Today* 100: 201-215, 2005.
Takanabe et al., "Mechanistic Aspects and Reaction Pathways for Oxidative Coupling of Methane on Mn/$Na_2WO_4$/$SiO_2$ Catalysts," *J. Phys. Chem. C* 113: 10131-10145, 2009.
Takanabe et al., "Rate and Selectivity Enhancements Mediated by OH Radicals in the Oxidative Coupling of Methane Catalyzed by Mn/$Na_2WO_4$/$SiO_2$," *Angew. Chem. Int. Ed.* 47: 7689-7693, 2008.
Trautmann et al., "Cryogenic Technology for Nitrogen Rejection from Variable Content Natural Gas," Presented at the XIV Covencion Internacional de Gas, Caracas, Venezuela, May 10-12, 2000, 13 pages.
Wang et al., "Autothermal oxidative coupling of methane on the $SrCO_3$/$Sm_2O_3$ catalysts," *Catalysis Communications* 10: 807-810, 2009.
Wang et al., "Comparative study on oxidation of methane to ethane and ethylene over $Na_2WO_4$-Mn/$SiO_2$ catalysts prepared by different methods," *Journal of Molecular Catalysis A: Chemical* 245: 272-277, 2006.
Wang et al., "Low-temperature selective oxidation of methane to ethane and ethylene over $BaCO_3$/$La_2O_3$ catalysts prepared by urea combustion method," *Catalysis Communications* 7: 59-63, 2006.
Wong et al., "Oxidative Coupling of Methane over Alkali Metal Oxide Promoted $La_2O_3$/$BaCO_3$ Catalysts," *J. Chem. Tech. Biotechnol.* 65: 351-354, 1996.
Yang et al., "Anisotropic synthesis of boat-shaped core-shell Au—Ag nanocrystals and nanowires," *Nanotechnology* 17: 2304-2310, 2006.
Zhou et al., "Functionalization of lanthanum hydroxide nanowires by atom transfer radical polymerization," *Nanotechnology* 18: 405704, 2007. (7 pages).
Zimmermann et al., "Ethylene," *Ulmann's Encyclopedia of Industrial Chemistry*, Wiley-VCH Verlag GmbH & Co. KGaA, Weinham, Germany, 2009, 66 pages.
Zurcher et al., "Nanowire Catalysts," U.S. Appl. No. 61/564,834, filed Nov. 29, 2011, 367 pages.
Zurcher et al., "Nanowire Catalysts," U.S. Appl. No. 61/651,399, filed May 24, 2012, 406 pages.
Mleczko et al., "Catalytic oxidative coupling of methane—reaction engineering aspects and process schemes," *Fuel Processing Technology* 42:217-248, 1995.
Guo et al., "Current Status and Some Perspectives of Rare Earth Catalytic Materials," *Journal of the Chinese Rare Earth Society* 25(1):1-15, Feb. 2007.
Ling et al., "Preparation of $Ag_{core}AU_{shell}$ Nanowires and Their Surface Enhanced Raman Spectroscopic Studies," *Acta Chimica Sinica* 65(9):779-784, 2007.
Niu et al., "Preparation and Characterization of $La_2O_2CO_3$ Nanowires with High Surface Areas," *Journal of The Chinese Rare Earth Society* 23(Spec. Issue):33-36, Dec. 2005.
Tong et al., "Development Strategy Research of Downstream Products of Ethene in Tianjin," *Tianjin Economy*, pp. 37-40, 1996.
Yu et al., "Oxidative Coupling of Methane Over Acceptor-doped $SrTiO_3$: Correlation Between p-type Conductivity and $C_2$ Selectivity and $C_2$ Yield," *Journal of Catalysis* 13(5):338-344, 1992.
Zhao, "Technologies and Catalysts for Catalytic Preparation of Ethene," *Industrial Catalysis* 12(Supplement):285-289, 2004.
Fallah, B. et al. "A New Nano-(2Li2O/MgO) Catalyst/Porous Alpha-Alumina Composite for the Oxidative Coupling of Methane Reaction" *AIChE Journal* (2010) 56(3):717-728.

(56) References Cited

OTHER PUBLICATIONS

Dedov, A.G. et al. "Oxidative coupling of methane catalyzed by rare earth oxides. Unexpected synergistic effect of the oxide mixtures" Applied Catalysis (2003) 245:209-220.
Taylor et al. "Lanthanum Catalysts for CH4 Oxidative Coupling: A Comparison of the Reactivity of Phases" Ind. Eng. Chem. Res. (1991) 30:1016-1023.
Agapie, T "Selective ethylene oligomerization: recent advances in chromium catalysis and mechanistic investigations" Coord Chem Rev (2011) 255:861-880.
Bergh, S. et al. "Combinatorial Heterogeneous Catalysis: Oxidative Dehydrogenation of Ethane to Ethylene, Selective Oxidation of Ethane to Acetic Acid, and Selective Ammoxidation of Propane to Acrylonitrile" Topics in Catalysis (2003) 23(1-4):65-79.
Carter, et al. "High activity ethylene trimerisation catalysts based on diphosphine ligands." Chem Commun (Camb). (Apr. 21, 2002) (8):858-9.
Dixon, J.T. et al. "Advances in selective ethylene trimerisation—a critical overview" J. Organometallic Chem. (2004) 689(23):3641-3668.
Dulai, A. et al. "N,N'-Bis(diphenylphosphino) diaminophenylphosphine Ligands for Chromium-Catalyzed Selective Ethylene Oligomerization Reactions" Organometallics (2011) 30(5):935-941.
Guo, X. et al. "Direct, Nonoxidative Conversion of Methane to Ethylene, Aromatics, and Hydrogen" Science (2014) 344:616-619.
Hinson, P.G. et al. "The oxidative coupling of methane on chlorinated Lithium-doped magnesium oxide" J Chem Soc, Chem Comm (1991) 20:1430-1432.
Jaramillo, P. et al. "Comparative analysis of the production costs and life-cycle GHG emissions of FT liquid fuels from coal and natural gas" Env. Sci. Tech (2008) 42:7559-7565.
Kaminsky, M.P. et al. "Deactivation of Li-Based Catalysts for Methane Oxidative Coupling" Poster ACS Symposium on Natural Gas Upgrading II (Apr. 5-10, 1992).
Kaminsky, M.P. et al. "Oxygen X-Ray Absorption Near-Edge Structure Characterization of the Ba-Doped Yttria Oxidative Coupling Catalyst" J Catalysis (1992) 136:16-23.
Miller, J.E. et al. "Oxidation reactions of ethane over Ba—Ce—O based perovskites" Applied Catalysis A: General (2000) 201:45-54.
Nagamoto, H. et al. "Methane Oxidation over Perovskite-type Oxide Containing Alkaline-earth Metal" Chemistry Letts (1988) 17(2):237-240.
O'Connor, C.T. et al. "Alkene oligomerization" Catalysis Today (1990) 6(3):329-349.
Peitz, S. et al. "An Alternative Mechanistic Concept for Homogeneous Selective Ethylene Oligomerization of Chromium-Based Catalysts: Binuclear Metallacycles as a Reason for 1-Octene Selectivity?" Chemistry—A European Journal (2010) 16(26):7670-7676.
Ren, T. et al. "Basic petrochemicals from natural gas, coal and biomass: Energy use and CO2 emissions" Res Conserv Recycl (2009) 53(9):513-528.
Schaarschmidt, D. et al. "Ferrocenyl phosphane nickel carbonyls: Synthesis, solid state structure, and their use as catalysts in the oligomerization of ethylene" J. Organometallic Chem. (2010) 695(10-11):1541-1549.
Song, S. et al. "Synthesis, characterization and ethylene oligomerization behaviour of 8-(1-aryliminoethylidene) quinaldinylnickel dihalides" Catal. Sci. Technol. (2011) 1(1):69-75.
Van Santen, R.A. et al. "An introduction to molecular heterogeneous catalysis" New Trends in Material Chemistry (1997) pp. 345-363.
Wang, X. et al. "Synthesis and Characterization of Lanthanide Hydroxide Single-Crystal Nanowires" Angew Chem Int Ed (2002) 41(24):4790-4793.

Zhang, Q. Journal of Natural Gas Chem., (2003) 12:81.
Zhu, F. et al. "Recent Research Progress in Preparation of Ethylene Oligomers with Chromium-Based Catalytic Systems" Designed Monomers & Polymers (2011) 14(1):1-23.
Natural Gas Spec Sheet, prepared by Florida Power and Light Company, 2003.
Schammel, W.P. et al. "Heterogeneous Catalysts" U.S. Appl. No. 14/701,963, filed May 1, 2015.
Choudhary, V.R. et al. "Oxidative Coupling of Methane over SrO Deposited on Different Commercial Supports Precoated with La2O3" Ind Eng Chem Res (1998) 37:2142-2147.
Au et al., "A Comparison of BaF2/La2O3 and BaBr2/La2O3 Catalysts for the Oxidative Coupling of Methane" J catalysis (Apr. 1996) 159(2):280-287.
Choudhary et al., "Oxidative Coupling of Methane and Oxidative Dehydrogenation of Ethane over Strontium-Promoted Rare Earth Oxide Catalysts" J Chem Tech and Biotech (Feb. 1998) 71(2):167-172.
Devi et al., "College Inorganic Chemistry" Devi, K.V.S. Laxmi, Patel, N.C., and Venkatachalam, A . . . College Inorganic Chemistry. Mumbai, IND: Himalaya Publishing House, 2010. Jan. 1 2010, XP055242276, Retrieved from the Internet: URL:http://site.ebrary.com/lib/epo/reader.action?docID=10415159 [retried on Jan. 18, 2016] the whole document.
Ferreira et al., "Effect of Mg, Ca, and Sr on CeO2 Based Catalysts for the Oxidative Coupling of Methane: Ivestigation on the Oxygen Species Responsible for Catalytic Performance" Indus and Eng Chem Res (Jul. 2012) 51(32):10535-10541.
Freer, E. et al., "Catalysts for Natural Gas Processes" U.S. Appl. No. 14/856,177, filed Sep. 16, 2015, 183 pages.
Gong et al., "Preparation of Carbon Nanotubes (CNTs)—Cordierite Monoliths by Catalytic Chemical Vapor Deposition as Catalyst Supports for Ammonia Synthesis" Catalysis Letts (May 2008) 122(3):287-294.
Istadi et al., "Synergistic effect of catalyst basicity and reducibility on performance of ternary CeO2-based catalyst for CO2 OCM to C2 hydrocarbons" J Mol Catalysis A: Chem (Nov. 2006) 259(1-2):61-66.
Ma, et al., "Processing and properties of carbon nanotubes-non-SiC ceramic" J Mat Sci (Nov. 1998) 33(21):5245-5246.
Ryu, K-H et al., "Preparation of Porous LaFeO3 Nanowires using AAO Template and Their Catalytic Properties" Bull. Korean Chem Soc. (2011) 32(7):2457-2460.
Schammel et al., "Catalysts for Petrochemical Catalysis" U.S. Appl. No. 14/777,333, filed Sep. 15, 2015, 259 pages . . . .
Tana et al., "Morphology-dependent redox and catalytic properties of CeO2 nanostructures: Nanowires, nano rods and nanoparticles" Catalysis Today (Oct. 2009) 148(1-2):179-183.
Theuerkauf et al., "Analysis of particle porosity distribution in fixed beds using the discrete element method" Powder Tech (Jul. 2006) 165(2):92-99.
Tian et al., "Catalytic reduction of NOx with NH3 over different-shaped MnO2 at low temperature" J Hazardous Mats (Jan. 2011) 188(1-3):105-109.
Valenzuela et al., "Nanostructured ceria-based catalysts for oxydehydrogenation of ethane with CO2" Topics in Catalysis (Jun. 2001) 15(2-4):181-188.
Wang et al., "Nanostructured Sheets of Ti—O Nanobelts for Gas Sensing and Antibacterial Applications" Adv Functional Mats (Apr. 2008) 18(7):1131-1137.
Zhang et al., "Relationship between packing structure and porosity in fixed beds of equilateral cylindrical particles" Chem Eng Sci (Dec. 2006) 61(24):8060-8074.
Galadima, A. et al. "Revisiting the oxidative coupling of methane to ethylene in the golden period of shale gas: A review" J Ind Eng Chem (Mar. 2016). http://dx.doi.org/10.1016/j.jiec.2016.03.027.

\* cited by examiner

METHOD FOR ISOLATION OF NANOMATERIALS

CROSS-REFERENCE TO RELATED APPLICATION

This application claims the benefit under 35 U.S.C. §119(e) of U.S. Provisional Patent Application No. 61/594,883, filed on Feb. 3, 2012; which application is incorporated herein by reference in its entirety.

BACKGROUND

1. Technical Field

This invention is generally related to methods for the isolation and/or purification of nanomaterials, such as nanowires.

2. Description of the Related Art

Recently, nanomaterials have been the subject of enormous interest. Nanomaterials, notable for their extremely small size (i.e., on the order of nanometers) can be prepared from various materials, including carbon, metals, ceramics, polymeric materials and composite materials. As a result of recent improvements in technologies to image and manipulate these materials, the nanomaterials field has seen a huge increase in funding from private enterprises and government, and a number of companies have been founded based on nanotechnology.

Nanomaterials have been proposed for use in a number of commercial applications, including electronic devices, miniature batteries, biomedical uses, packaging films, superabsorbants, armor, and automobile components. More recently, nanomaterials (e.g., nanowires) have been shown to be useful catalysts in industrially important reactions, such as the oxidative coupling of methane (PCT Pub. No. WO 2011/149,996). Accordingly, methods for the preparation of nanomaterials at commercially relevant scales are becoming increasingly important.

There are many known methods for preparing nanomaterials. Such methods are generally divided into two types: physical methods and chemical methods. Generally, the physical methods include, for example, chemical or mechanical polishing methods and high-energy ball milling methods. The chemical methods include, for example, chemical vapor deposition, sol-gel methods, hydrothermal synthesis and template-directed synthesis. Regardless of the method of preparation, nanomaterials are generally isolated via centrifugation since their small size typically results in suspensions or slurries which cannot be isolated by other means. Unfortunately, centrifugation is not a viable method for isolation of nanomaterials at commercially relevant large scales (kg to ton quantities) since the physical size of known centrifuges that are capable of separating such materials significantly limits their throughput.

Accordingly, there remains a need in the art for methods for isolating nanomaterials at commercially relevant scales, for example methods for the isolation of nanowires at large scales. The present invention fulfills these needs and provides further related advantages.

BRIEF SUMMARY

In brief, isolation and purification of nanomaterials and related methods are disclosed. In contrast to previously reported preparations of nanomaterials, the present inventors have discovered that, under appropriate conditions, nanomaterials can be isolated and/or purified by filtration-based methods. Advantageously, the disclosed methods allow for preparation of nanomaterials at scales heretofore unobtainable. For example, methods according to the present disclosure allow for preparation of nanomaterials at commercially relevant scales (e.g., kilograms to tons). Furthermore, the filtration-based methods are particularly useful for purifying nanomaterials (e.g., by washing a filter cake) and/or incorporating dopants.

In one embodiment, the present disclosure provides a method for isolating inorganic nanowires, the method comprising providing a suspension comprising the inorganic nanowires and filtering the suspension through a filter press to separate a filtrate from the inorganic nanowires, wherein the filter press comprises a plurality of filter plates, each filter plate comprising a filter medium disposed thereon.

In some embodiments, the inorganic nanowires comprise catalytic nanowires. In other embodiments, the inorganic nanowires comprise phage-templated nanowires. In still other embodiments, the inorganic nanowires comprise metal oxide nanowires. In yet other embodiments, the inorganic nanowires are inorganic catalytic polycrystalline nanowires, the nanowires having a ratio of effective length to actual length of less than one (i.e., a bent morphology) and an aspect ratio of greater than ten as measured by TEM in bright field mode at 5 keV. In still other embodiments, the inorganic nanowires comprise one or more elements from any of Groups 1 through 7, lanthanides, actinides or combinations thereof. In other embodiments of the methods, the inorganic nanowires have a ratio of effective length to actual length of substantially equal to one (i.e., straight morphology) as measured by TEM in bright field mode at 5 keV.

In other embodiments, the suspension comprising the inorganic nanowires further comprises an admixture of particulate material of substantially equivalent or larger size than the inorganic nanowires.

In still other embodiments, the filter medium comprises PES (polyethersulfone) membranes, cellulose, cellulose acetate and regenerated cellulose membranes (i.e., typical paper filters), polypropylene membranes/cloth, Teflon and other fluoropolymer (hydrophilic and hydrophobic) membranes, glass fibers or fritted glass, other polymer membranes (e.g., polyester) or metal mesh.

Some embodiments of the foregoing method further comprise feeding the suspension through the filter press at pressures ranging from 1 to 100 PSI, from 10 to 80 psi or from 20 to 40 psi. In other embodiments, the method further comprises re-introducing the filtrate to the filter press one or more times. In still other embodiments, the method further comprises obtaining a filter cake comprising the inorganic nanowires.

Other embodiments further comprise passing a wash solvent through the filter cake one or more times. For example, the wash solvent may be selected from water, methanol, ethanol, isopropanol, acetone, ethylacetate, pentane, hexane, cyclohexane, octane, benzene, toluene, xylene, mesitylene, diethyl ether, tetrahydrofuran, and combinations thereof.

In other embodiments, the method comprises passing a solution comprising a dopant through the filter cake one or more times. For example, the solution comprising the dopant may be allowed to contact the filter cake for a period of time sufficient to incorporate the dopant into or on the surface of the nanomaterial.

In yet other embodiments, the method comprises drying the filter cake. For example, in some embodiments drying comprises heating the filter cake. In other embodiments, drying comprises passing a gas through the filter cake. In some embodiments, the gas comprises air, nitrogen or argon, and in other embodiments the gas is heated. In some other embodiments drying comprises applying vacuum to the filter cake.

In other certain embodiments, the methods comprise isolating a filter cake comprising the inorganic nanowires.

In still other embodiments, the method further comprises providing the inorganic nanowires for use in catalysis, batteries, electronics, photovoltaics or nanocomposite materials. For example, in some embodiments the use is catalysis, such as the catalytic oxidation of methane.

In another aspect, the present disclosure provides an inorganic nanowire isolated according to any of methods described herein. Further embodiments include use of the inorganic nanowire in catalysis, batteries, electronics, photovoltaics or nanocomposite materials. For example, in some embodiments the use is catalysis, such as the catalytic oxidation of methane.

In still other embodiments, the present disclosure provides a method for the oxidative coupling of methane, the method comprising contacting an inorganic nanowire isolated according to the disclosed methods with a gas comprising methane and oxygen.

These and other aspects of the invention will be apparent upon reference to the following detailed description. To this end, various references are set forth herein which describe in more detail certain background information, procedures, compounds and/or compositions, and are each hereby incorporated by reference in their entirety.

BRIEF DESCRIPTION OF THE SEVERAL VIEWS OF THE DRAWINGS

In the drawings, the sizes and relative positions of elements in the drawings are not necessarily drawn to scale. For example, the various elements and angles are not drawn to scale, and some of these elements are arbitrarily enlarged and positioned to improve drawing legibility. Further, the particular shapes of the elements as drawn are not intended to convey any information regarding the actual shape of the particular elements, and have been selected solely for ease of recognition in the drawings.

DETAILED DESCRIPTION OF THE INVENTION

In the following description, certain specific details are set forth in order to provide a thorough understanding of various embodiments. However, one skilled in the art will understand that the invention may be practiced without these details. In other instances, well-known structures have not been shown or described in detail to avoid unnecessarily obscuring descriptions of the embodiments. Unless the context requires otherwise, throughout the specification and claims which follow, the word "comprise" and variations thereof, such as, "comprises" and "comprising" are to be construed in an open, inclusive sense, that is, as "including, but not limited to." Further, headings provided herein are for convenience only and do not interpret the scope or meaning of the claimed invention.

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. Also, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

DEFINITIONS

As used herein, and unless the context dictates otherwise, the following terms have the meanings as specified below.

"Filter press" or "plate and frame filter press" means an apparatus for physical separation of solids and liquids. A filter press generally comprises multiple filter plates arranged in parallel, such that when a slurry or suspension is passed through the filter press, solids are retained on the filter plates and liquid passes through. Filter presses are well known in the art and are described in more detail below.

"Filter medium" is any medium suitable for physical separation of liquids and solids. Filter presses generally comprise filter plates having a filter medium disposed thereon. Filter medium may include substrates having pores sized to exclude passage of solid particles, while allowing passage of smaller liquid molecules (e.g., filter cloths, membranes and the like). Filter medium also includes substrates comprising a plurality of particles, such that the particles serve as a physical barrier to the passage of other solid particles (e.g., diatomaceous earth and the like). Non-limiting examples of filter media include: PES (polyethersulfone) membranes, cellulose, cellulose acetate and regenerated cellulose membranes (i.e., typical paper filters), polypropylene membranes/cloth, Teflon and other fluoropolymer (hydrophilic and hydrophobic) membranes, glass fibers or fritted glass, other polymer membranes (e.g., polyester) and metal mesh.

"Nanomaterial" refers to a material having at least one dimension on the order of nanometers (e.g. between about 1 and 100 nanometers). Nanomaterials include, but are not limited to, nanoparticles, nanocrystals, nanowires, nanorods, nanoplates, nanotubes and the like.

"Nanoparticle" or "nanocrystal" means a particle having at least one diameter on the order of nanometers (e.g. between about 1 and 100 nanometers).

"Nanowire" means a wire-like structure having at least one diameter on the order of nanometers (e.g. between about 1 and 100 nanometers) and an aspect ratio greater than or equal to 10:1. The "aspect ratio" of a nanowire is the ratio of the actual length (L) of the nanowire to the diameter (D) of the nanowire.

A "nanorod" means a rod-like structure having at least one diameter on the order of nanometers (e.g. between about 1 and 100 nanometers) and an aspect ratio less than 10:1. The "aspect ratio" of a nanorod is the ratio of the actual length (L) of the nanorod to the diameter (D) of the nanorod.

A "nanoplate" is a plate-like structure having at least one dimension on the order of nanometers (e.g. between about 1 and 100 nanometers) and an aspect ratio less than or equal to 1:5.

"Nanotubes" are cylindrical structures having at least one diameter on the order of nanometers (e.g. between about 1 and 100 nanometers). Nanotubes generally have an aspect ratio greater than or equal to 10:1. Exemplary nanotubes include carbon nanotubes and silicon nanotubes.

The "aspect ratio" of a nanomaterial is the ratio of the actual length (L) of the nanomaterial to the diameter (D) of the nanomaterial. Aspect ratio is expressed as L:D.

"Actual length" of a nanomaterial, for example a nanowire, means the distance between the two distal ends of a nanomaterial as traced through the backbone of the nanomaterial as measured by TEM in bright field mode at 5 keV.

The "diameter" of a nanomaterial is measured in an axis perpendicular to the axis of nanomaterial's actual length (i.e. perpendicular to the nanowire's or nanorod's backbone). The diameter of a nanomaterial will vary from narrow to wide as measured at different points along the nanomaterial backbone. As used herein, the diameter of a nanomaterial is the most prevalent (i.e. the mode) diameter.

"Polycrystalline nanowire" means a nanowire having multiple crystal domains. Polycrystalline nanowires generally have different morphologies (e.g. bent vs. straight) as compared to the corresponding "single-crystalline" nanowires.

"Effective length" of a nanowire means the shortest distance between the two distal ends of a nanowire as measured by transmission electron microscopy (TEM) in bright field mode at 5 keV. "Average effective length" refers to the average of the effective lengths of individual nanowires within a plurality of nanowires.

"Catalyst" means a substance which alters the rate of a chemical reaction. A catalyst may either increase the chemical reaction rate (i.e. a "positive catalyst") or decrease the reaction rate (i.e. a "negative catalyst"). Catalysts participate in a reaction in a cyclic fashion such that the catalyst is cyclically regenerated. "Catalytic" means having the properties of a catalyst, for example a "catalytic nanowire" is a nanowire having the properties of a catalyst.

"Inorganic" means a substance comprising a metal element. Typically, an inorganic substance (e.g., nanowire) includes one or more metals in its elemental state, or more preferably, a compound formed by a metal ion ($M^{n+}$, wherein n is 1, 2, 3, 4, 5, 6 or 7) and an anion ($X^{m-}$, m is 1, 2, 3 or 4) which balance and neutralize the positive charges of the metal ion through electrostatic interactions. Non-limiting examples of inorganic compounds include oxides, hydroxides, oxyhydroxides, halides, nitrates, oxynitrates, sulfates, carbonates, oxycarbonates, phosphates, acetates, oxalates, and combinations thereof, of metal elements.

"Salt" means a compound comprising negative and positive ions. Salts are generally comprised of cations and counter ions or anions and counter ions.

"Oxide" refers to a metal compound comprising oxygen. Examples of oxides include, but are not limited to, metal oxides ($M_xO_y$), metal oxyhalides ($M_xO_yX_z$), metal oxynitrates ($M_xO_y(NO_3)_z$), metal phosphates ($M_x(PO_4)_y$), metal oxycarbonates ($M_xO_y(CO_3)_z$), metal carbonates, metal oxyhydroxides ($M_xO_y(OH)_z$) and the like, wherein x, y and z are numbers from 1 to 100.

"Dopant" or "doping agent" is an impurity added to or incorporated within a catalyst to optimize catalytic performance (e.g. increase or decrease catalytic activity). As compared to the undoped catalyst, a doped catalyst may increase or decrease the selectivity, conversion, and/or yield of a reaction catalyzed by the catalyst. A dopant may comprise any element from the periodic table.

"Bulk material" means a material prepared by traditional techniques, for example by milling or grinding large particles to obtain smaller/higher surface area particles. Bulk materials are prepared with minimal control over the size and/or morphology of the material.

1. Isolation of Nano Materials

As noted above, the present disclosure is directed to methods for isolation of nanomaterials. In some embodiments, the nanomaterials to be isolated are nanowires, for example inorganic nanowires. Further embodiments include methods for purification and/or doping (i.e., intentional inclusion of a desired impurity) of a nanomaterial. The type of nanomaterial and its method of preparation are not particularly limited. For example, some embodiments are directed to isolation, purification and/or doping of nanomaterials, wherein the nanomaterials are selected from nanoparticles, nanocrystals, nanowires, nanorods, nanoplates and nanotubes.

In certain embodiments, the nanomaterial is a nanowire, for example an inorganic nanowire. In some other embodiments the nanowire is a metal oxide nanowire. In other embodiments, the nanowire is a catalytic nanowire. In even other embodiments, the nanomaterial is a phage-templated nanowire. In still other embodiments, the inorganic nanowires are inorganic catalytic nanowires, which may be single crystalline or polycrystalline and may have a ratio of effective length to actual length of less than one (i.e., a bent morphology) or substantially equal to one (i.e., a straight morphology) and an aspect ratio of greater than ten as measured by TEM in bright field mode at 5 keV. In still other embodiments, the nanowire comprises one or more elements from any of Groups 1 through 7, lanthanides, actinides or combinations thereof. Non-limiting examples of nanowires (including various morphologies and compositions), which may be isolated according to the present invention, and methods for their preparation, are described in co-pending U.S. application Ser. Nos. 13/115,082; 13/689,611 and 13/689,514; the full disclosures of which are hereby incorporated by reference in their entireties for all purposes.

In contrast to other reported methods for preparation and isolation of nanowires, the present inventors have unexpectedly discovered, that inorganic nanomaterials can be isolated from suspensions (also referred to as a "slurry") by filtration-based methods, instead of the presently used centrifugation-based methods. The inventive methods allow for preparation of nanomaterials and nanomaterial containing compositions at scales not previously attainable in an economical fashion. High throughput nanomaterial production processes, including the high-throughput isolation and/or purification processes described herein, are particularly useful for providing nanomaterials for use in any number of nanomaterial applications, including applications in catalysis, batteries, electronics, photovoltaics, nanocomposite materials and the like. For example, the methods find utility in the production of catalytic nanomaterials for use in large scale catalysis operations, e.g., for use in petrochemical catalytic operations, such as oligomerization processes or other catalytic conversion reactions, e.g., in the oxidative coupling of methane, as described in U.S. patent application Ser. Nos. 13/115,082; 13/689,611 and 13/689,514, previously incorporated herein by reference in their entireties for all purposes.

Accordingly, one embodiment of the present invention provides a nanomaterial, such as a nanowire, isolated according to the disclosed methods. The nanowire may be provided for use in any number of nanowire applications, including any of the foregoing applications. In one particular embodiment, the nanowire is isolated and provided for use in a catalytic reaction, such as the oxidative coupling of methane. Such methods include contacting the nanowire with a gas comprising oxygen and methane. Methods for use of catalytic nanowires in catalytic reactions are described in detail in U.S. patent application Ser. Nos. 13/115,082; 13/689,611 and 13/689,514, previously incorporated herein by reference in their entireties for all purposes.

Furthermore, the filtration based methods provide a means for purification of nanomaterials since an isolated filter cake can be easily washed to remove impurities. Advantageously, when the wash solution contains a desired dopant, for example in the form of a soluble salt, the dopant can be incorporated into the nanomaterial by a simple wash (and optional soak) step(s). In contrast, purification of centrifuged nanomaterials often requires multiple cycles of resuspending, washing and recentrifuging the nanomaterials, and cannot be done economically at commercially relevant scales.

Accordingly, one embodiment of the present invention is a method for isolating a nanomaterial, the method comprising providing a suspension containing a nanomaterial and filtering the suspension to separate a liquid component from the nanomaterial. In certain embodiments, the suspension is filtered via a filter press, for example a filter press comprising a plurality of filter plates, each filter plate having a filter medium disposed thereon. The filter press is generally operated at pressures greater than atmospheric pressure (i.e., not gravity filtration). Filter presses are well-known to one of ordinary skill in the art, and the exact type or design of filter press useful in practice of the invention is not limited.

Figure 1A:
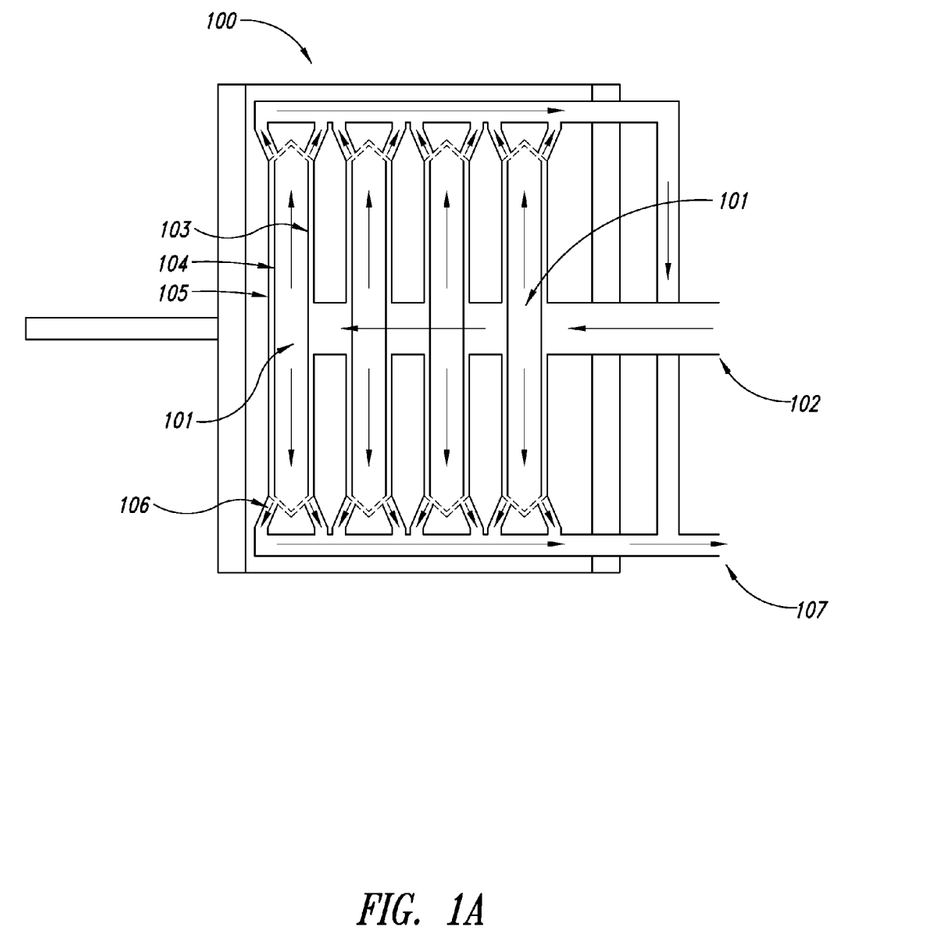
FIG. 1A schematically depicts a representative filter press.
Figure 1B:
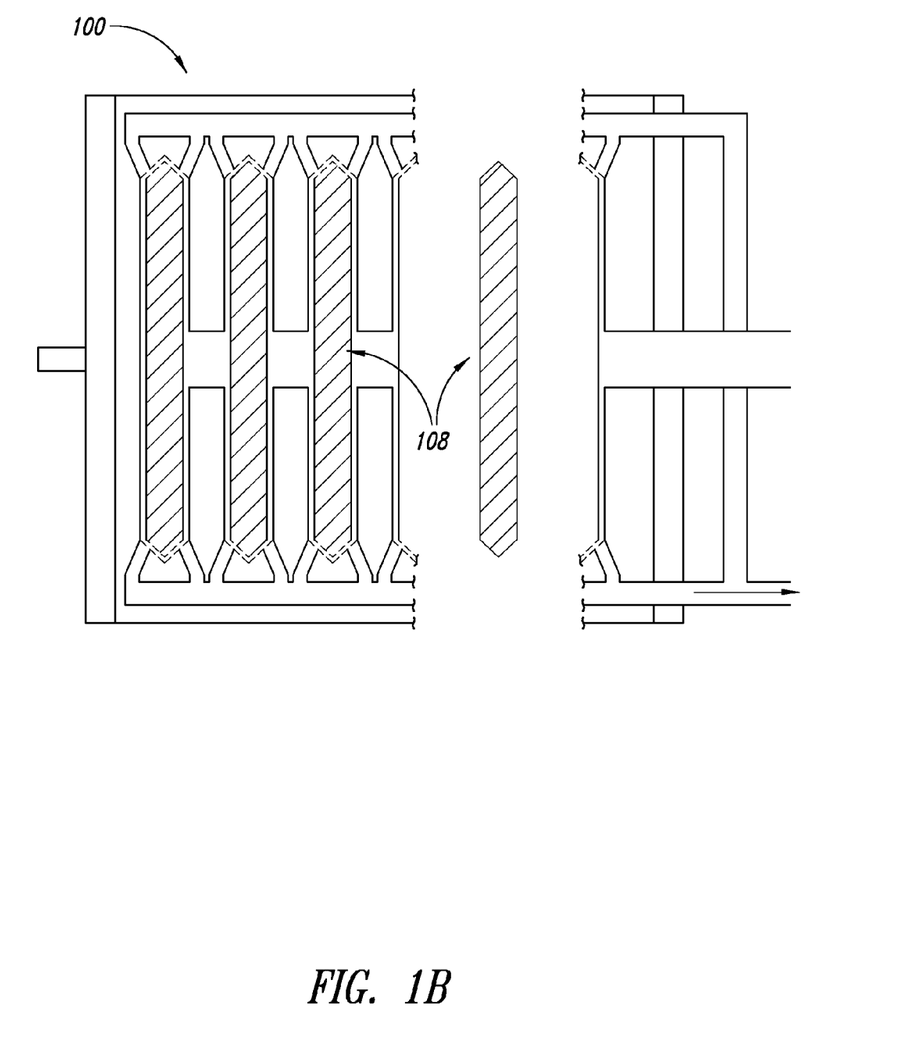
FIG. 1B shows an exemplary filter press in the open position, allowing removal of the filter cake.

An exemplary filter press useful in one embodiment is depicted in FIGS. 1A and 1B. In operation, slurry is pumped under pressure into the press chambers 101 through the manifold 102 at the stationary head of the filter press 100. Arrows in FIG. 1A indicate the direction of flow. As each chamber fills with slurry, the liquid passes through the filter medium 103 disposed on the filter plates 104, through the drain field 105 and drain ports 106 and exits out of the discharge eyes 107. Compared to traditional filtration methods, the multiple filter plates provide increased surface area on which a filter cake of nanomaterials 108 is deposited. The number of filter plates within a filter press can be varied based on the scale and filtration properties of the nanomaterial. For example, certain embodiments include use of a plurality of filter plates, for example 2 to 5, 6 to 10, 11 to 15, 15 to 20, or even more than 20 filter plates.

The prime function of the filter media is to provide a porous support structure for the filter cake as it develops and builds. Initially, some solids may pass through the filter media causing a slight turbidity in the filtrate, but gradually the larger particles within the slurry begin to bridge the openings in the filter media reducing the effective opening size. This allows smaller particles to bridge these reduced openings initiating the cake filtration process. Once a layer of solid particles builds on the filter medium (e.g., 1 to 2 mm in thickness), this "precoat" layer of nanomaterials serves as a type of "self filtration" to separate out finer and finer particles as the cake builds in thickness, yielding a filtrate that is very low in turbidity. Advantageously, the filtrate can be recycled through the filter cake to capture any nanomaterials which may have passed through the filter medium. Such recycling can be repeated until a filtrate substantially free of nanomaterials is obtained.

In some embodiments, an admixture may be created by adding an additional material to the slurry containing the nanomaterials to be filtered. The additional material that is admixed may be of similar or dissimilar size as compared to the nanomaterials, and can, in many cases, contribute to the effective formation of the growing filter cake on the filter medium. For example, by incorporating a larger particle size material, e.g., an inert particulate material, larger sized material of similar composition, similar or complementary function, or the like, the growing filter cake will entrain the nanomaterials along with the larger particles, and thereby prevent or reduce fouling of the filter medium with the nanomaterials. As above, such admixture materials may also be employed in a precoating step, to provide an initial additional filter medium on top of any filter membrane or pad. In some embodiments, the admixture material is selected from a diluent material to be incorporated with the nanomaterials in their ultimate application. Such diluent materials may include inert or functional materials. For example, where the nanomaterials are to be employed in catalysis applications, the diluent materials are optionally selected from inert support or diluent materials. Non limiting examples of some diluent materials include alkaline earth metal compounds, inorganic oxides, $Al_2O_3$, $SiO_2$, $TiO_2$, MgO, CaO, SrO, $ZrO_2$, ZnO, $LiAlO_2$, $MgAl_2O_4$, MnO, $MnO_2$, $Mn_3O_4$, $La_2O_3$, $AlPO_4$, $SiO_2/Al_2O_3$, activated carbon, silica gel, zeolites, activated clays, activated $Al_2O_3$, SiC, diatomaceous earth, magnesia, aluminosilicates, calcium aluminate, nanowires of various compositions or combinations thereof. Alternatively, the diluent materials may include catalytically active materials of similar or complementary activity to the nanowire materials being filtered, e.g., bulk catalyst materials. Examples of diluent materials and bulk catalyst materials include those generally known in the art, as well as those described for example, in provisional U.S. patent application Ser. Nos. 13/115,082 and 13/689,611, previously incorporated herein by reference as well as U.S. patent application Ser. No. 13/479,767 and U.S. Provisional Application No. 61/651,396, the full disclosures of which are incorporated herein by reference in their entireties.

Types of filter media include PES (polyethersulfone) membranes, cellulose, cellulose acetate and regenerated cellulose membranes (i.e., typical paper filters), polypropylene membranes/cloth, Teflon and other fluoropolymer (hydrophilic and hydrophobic) membranes, glass fibers or fritted glass, other polymer membranes (e.g., polyester) and metal mesh. The pore size of filter media useful in certain embodiments of the invention is not particularly limited. For example the pore size may vary from about 0.2 microns to about 100 microns, depending on the type of material being filtered, the pressure applied, the process solvent and other process parameters.

Generally, the slurry is driven through the filter press by means of pressure, although vacuum assistance may used in some instances. The pressure behind the slurry may be provided by a feed pump. The pressure behind the slurry will vary in various embodiments and depends on the nanomaterial, size of the filter press, filter surface area, solvent, membrane material and porosity, filter cake size and other process parameters. One of ordinary skill in the art can easily derive the pressure required for various processes. In certain embodiments, the pressure ranges from about 1 PSI to about 100 PSI, for example from about 10 PSI to about 80 PSI or from about 20 PSI to about 40 PSI.

The feed pump is generally selected based on the pressure and flow desired, the type of material being filtered and the type of filter media. Examples of pumps useful in certain embodiments include diaphragm pumps, peristaltic pumps, piston pumps and centrifugal pumps. Non-shearing or low shear pumps, such as diaphragm or other positive displacement pumps are particularly preferred, to avoid the potential for excessive fragmentation of nanomaterials. With a gravity drain on the filtrate side of the press, a pressure differential between the feed pressure and the gravity discharge is created across the filter media and the filter cake solids as they build in thickness. While not wishing to be bound by theory, it is believe that the existence of this pressure differential, not just the feed pump pressure, causes the filtering action to occur. Solids within the slurry will flow to the area of cake development with the lowest pressure differential, resulting in a filter cake that builds uniformly over one or more filter plates.

Once the filtration is complete, for example when all slurry has been fed into the filter press and the filtrate is substantially free of nanomaterial and any optional washing, drying and/or doping steps are complete, the hydraulic closure of the press is retracted, the individual filter elements are separated and the filter cakes are discharged, usually by gravity or scraping, etc., to an appropriate receptacle.

Figure 2:
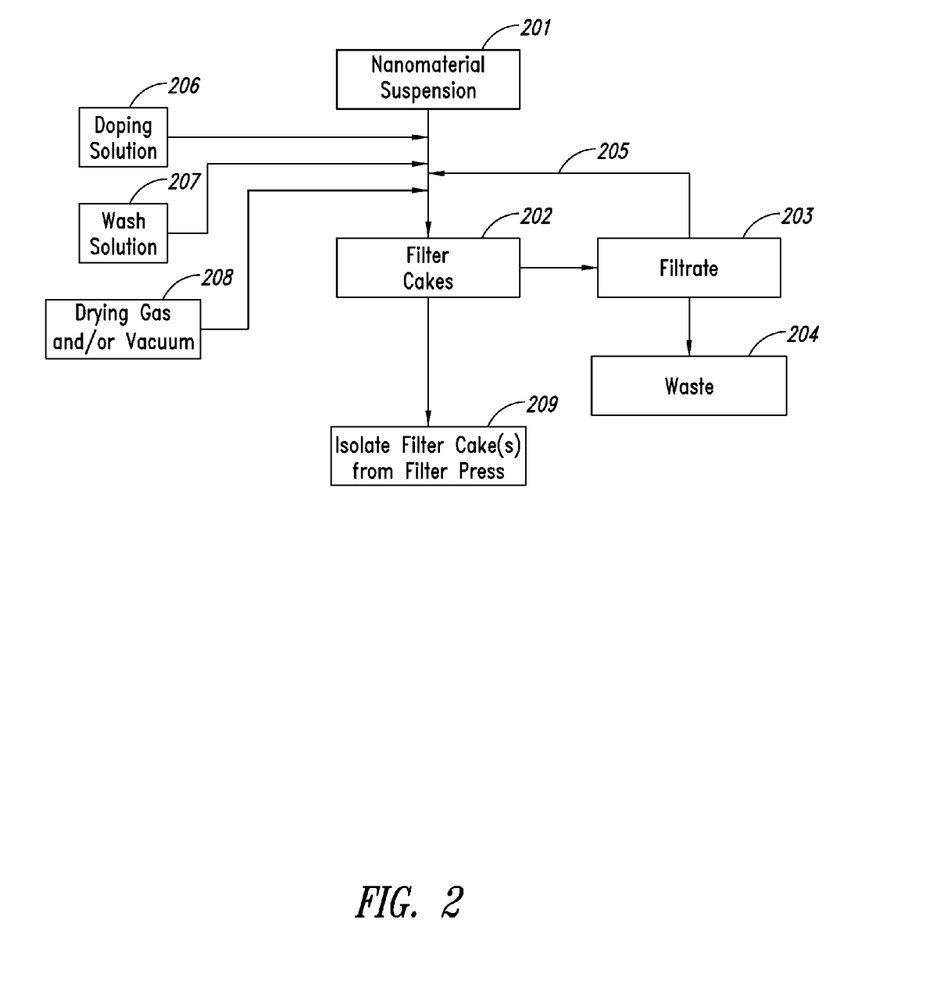
FIG. 2 is a workflow according to one embodiment of the present invention.

Various parameters of the foregoing filtration process may be varied depending on the desired results. A typical filtration work flow according to one embodiment of the present invention is depicted in FIG. 2. The process begins with providing a suspension containing a nanomaterial 201 and feeding the suspension into the filter press. Passage of the suspension through the filter press may be aided by pressure, vacuum or both. The suspension is passed through the filter medium (e.g., contained on one or more filter plates) until one or more filter cakes of nanomaterial 202 are obtained. As the filter cake(s) builds, it may serve as an additional filter medium and increase the efficiency of the filtration. Filtrate 203 is collected at the exit of the filter press and may be discharged to waste 204. Depending on the type and size of nanomaterial and filter medium, an optional step 205 of recirculating the filtrate through the filter medium one or more times may be included to ensure all nanomaterials are recovered from the filtrate.

Further optional steps may include doping the nanomaterial after filtration. In these embodiments, a solution comprising the desired dopant 206, for example in the form of a soluble salt, may be introduced into the filter press in a manner such that the filter cake is contacted with the solution. The solution may be either passed continuously through the filter cake, or the solution may be charged to the filter press, and the filter cake allowed to contact the doping solution for a period of time (e.g., 1-24 hours) before pressure and/or vacuum is applied and the doping solution removed. The optional doping step may be performed, before or after the optional washing and/or drying steps discussed below.

The isolation methods may also further include purification of the isolated nanomaterials. For example, in some embodiments once the filter cake(s) is obtained an appropriate wash solution 207 is introduced into the filter press and passed through the filter cake(s). The wash solution may be either passed continuously through the filter cake(s) or the filter cake(s) may be allowed to contact the wash solution for a sufficient period of time (e.g., 0.1-24 hours). One or more cycles of washes may be performed depending on the nature of the impurities and the desired level of purity. The optional purification/wash step may be performed, before and/or after the optional doping and/or drying steps. Furthermore, certain embodiments include washing and doping the nanomaterial simultaneously (e.g., in a single step). Such embodiments include using a wash solution which contains a desired dopant.

The composition of the wash solution is not particularly limited and will vary depending on the identity of the impurities to be removed, solubility of the nanomaterials, etc. Typical wash solutions include, but are not limited to, water, methanol, ethanol, isopropanol, acetone, ethylacetate, pentane, hexane, cyclohexane, octane, benzene, toluene, xylene, mesitylene, diethyl ether, tetrahydrofuran, and combinations thereof. Some embodiments include washing the filter cake one or more times. The wash steps may be performed with the same or different solvents. For example the filter cake may be washed sequentially with solvents of different polarities such as water, ethanol and hexane.

As seen in FIG. 2, other optional steps include drying the filter cake(s) 208 prior to discharge from the filter press. In these embodiments, the filter cake may be dried by passing a gas through the filter cake for a period of time sufficient to completely or partially remove residual solvent, wash solution, etc. Gasses useful in this regard include air or inert gases such as nitrogen or argon. Drying rate can sometimes be increased by heating the filter cake and/or the gas. Vacuum drying may also be used in some embodiments. The optional drying step may be performed, before and/or after the optional doping and/or purification steps. Multiple drying steps may also be performed, for example the filter cake may be dried after washing and dried again after doping.

Once the nanomaterials are isolated in the form of a filter cake, the filter press is opened (FIG. 1B) and the filter cake is isolated using methods known in the art 209, such as by scraping the filter cake from the plate, or where dried in situ, separating the dried cake from the filter medium, or the like.

In certain applications, the filter cake may be further processed, e.g., to add additional formulation elements to the nanomaterials, or to provide the nanomaterials in a form suitable for their end application. For example, in some cases, the filter cake, or further processed nanomaterials derived from the filter cake, may be extruded or pressed into extrudates or pellets, and/or resuspended in a different medium for use or additional processing, depending upon the desired application for the nanomaterials.

The following examples are meant for purpose of illustration, and not limitation, of the disclosed methods.

EXAMPLES

Example 1

Isolation and Purification of Nanowires

Nanowires were prepared on a 50 L scale using the procedures described in U.S. patent application Ser. No. 13/115,082. The nanowires were isolated and purified using a filter press (Star PolyPress SPP-5, available from the Hilliard Corporation 100 West Fourth Street Elmira, N.Y.) equipped with 3 polypropylene cassettes (i.e., filter plates) with 3 cfm polypropylene cloths (measured in air flow across the cloth at a pressure of 0.02 psi), for a total cake capacity of 0.3 ft$^3$ and a cloth area of 7 ft$^2$, and a polypropylene diaphragm pump with Teflon diaphragms.

The nanowires slurry was pumped from the reactor vessel to the filter press via the polypropylene pump at an inlet pressure of 20 psi to allow for the solids to build in between the plates. The filtrate was recirculated back into the reactor vessel. When the desired clarity of the filtrate was achieved, the filtrate was then switched to a waste drum. The inlet pressure was then increased to approximately 40 psi. Once the entire amount of nanowires slurry was filtered through the filter press, the cakes were washed with 35 L of distilled water and then dried by passing air through the cakes for 15 min. The plates were then released, the nanowires were collected in a Pyrex® pan and then dried overnight at 120° C. in an oven. This process produced 0.8 kg of dried nanowires.

Example 2

Doping of Nanowires

Nanowires are prepared according to the general procedure described in Example 1. After the filter cakes are washed with water, 15 L of a 1 M NaNO₃ solution are recirculated through the filter press for 2 h in order to contact the nanowires cakes with the doping solution. The cakes are then dried and collected as described in Example 1.

Nanowires comprising any desired dopant(s) are prepared according to the foregoing procedures by changing the salt solution.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, are incorporated herein by reference, in their entirety. Aspects of the embodiments can be modified, if necessary to employ concepts of the various patents, applications and publications to provide yet further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for isolating inorganic nanowires comprising a dopant, the method comprising providing a suspension comprising the inorganic nanowires and filtering the suspension through a filter press to separate a filtrate from the inorganic nanowires to obtain a filter cake comprising the inorganic nanowires, the method further comprising:
   A) passing a solution comprising a soluble salt of the dopant through the filter cake one or more times;
   B) drying the filter cake; and
   C) isolating a plurality of individual inorganic nanowires from the filter cake, wherein the filter press comprises a plurality of filter plates, each filter plate comprising a filter medium disposed thereon.

2. The method of claim 1, wherein the inorganic nanowires comprise catalytic nanowires.

3. The method of claim 1, wherein the inorganic nanowires comprise phage-templated nanowires.

4. The method of claim 1, wherein the inorganic nanowires comprise metal oxide nanowires.

5. The method of claim 1, wherein the inorganic nanowires are inorganic catalytic polycrystalline nanowires, the nanowires having a ratio of effective length to actual length of less than one and an aspect ratio of greater than ten as measured by TEM in bright field mode at 5 keV.

6. The method of claim 1, wherein the inorganic nanowires comprise one or more elements from any of Groups 1 through 7, lanthanides, actinides or combinations thereof.

7. The method of claim 1, wherein the inorganic nanowires have a ratio of effective length to actual length of substantially equal to one as measured by TEM in bright field mode at 5 keV.

8. The method of claim 1, wherein the suspension comprising the inorganic nanowires further comprises an admixture of particulate material of substantially equivalent or larger size than the inorganic nanowires.

9. The method of claim 1, further comprising re-introducing the filtrate to the filter press one or more times.

10. The method of claim 1, wherein the solution comprising the dopant is allowed to contact the filter cake for a period of time sufficient to incorporate the dopant into or on the surface of the inorganic nanowires.

11. The method of claim 1, wherein drying the filter cake comprises heating the filter cake.

12. The method of claim 1, wherein drying the filter cake comprises passing a gas through the filter cake.

13. The method of claim 1, wherein drying comprises applying vacuum to the filter cake.

14. The method of claim 1, further comprising providing the isolated inorganic nanowires for use in a method comprising contacting the isolated inorganic nanowires with a gas comprising methane and oxygen, thereby oxidatively coupling the methane.

15. The method of claim 1, wherein the filter medium comprises a polymer membrane.

16. The method of claim 1, wherein steps (A) and (B) are performed in the filter press.

17. A method for isolating inorganic nanowires, the method comprising providing a suspension comprising the inorganic nanowires and filtering the suspension through a filter press to separate a filtrate from the inorganic nanowires to obtain a filter cake comprising the inorganic nanowires, the method further comprising:
   A) passing a solution comprising a dopant, through the filter cake one or more times;
   B) drying the filter cake by passing a gas through the filter cake; and
   C) removing the dried filter cake from the filter press and isolating a plurality of individual inorganic nanowires from the filter cake, wherein the filter press comprises a plurality of filter plates, each filter plate comprising a filter medium disposed thereon.

18. The method of claim 17, wherein steps (A) and (B) are performed in the filter press.

19. The method of claim 17, wherein the inorganic nanowires are inorganic catalytic polycrystalline nanowires, the nanowires having a ratio of effective length to actual length of less than one and an aspect ratio of greater than ten as measured by TEM in bright field mode at 5 keV.

20. The method of claim 17, wherein the inorganic nanowires comprise one or more elements from any of Groups 1 through 7, lanthanides, actinides or combinations thereof.

21. The method of claim 17, wherein the inorganic nanowires have a ratio of effective length to actual length of substantially equal to one as measured by TEM in bright field mode at 5 keV.

22. The method of claim 17, wherein the suspension comprising the inorganic nanowires further comprises an admixture of particulate material of substantially equivalent or larger size than the inorganic nanowires.

23. The method of claim 17, wherein the filter medium comprises PES (polyethersulfone), cellulose, cellulose acetate, regenerated cellulose, polypropylene, a hydrophilic or hydrophobic fluoropolymer, glass fibers, fritted glass, polyester or metal mesh.

24. The method of claim 17, wherein the method further comprises feeding the suspension through the filter press at pressures ranging from 20 to 40 PSI.

25. A method for isolating inorganic nanowires, the method comprising providing a suspension comprising the inorganic nanowires and filtering the suspension through a filter press to separate a filtrate from the inorganic nanowires to obtain a filter cake comprising the inorganic nanowires, the method further comprising:
  A) passing a solution comprising a dopant through the filter cake one or more times;
  B) passing a wash solvent selected from methanol, ethanol, isopropanol, acetone, ethylacetate, pentane, hexane, cyclohexane, octane, benzene, toluene, xylene, mesitylene, diethyl ether, tetrahydrofuran, and combinations thereof, through the filter cake one or more times;
  C) drying the filter cake by passing a gas through the filter cake; and
  D) removing the dried filter cake from the filter press and isolating a plurality of individual inorganic nanowires from the filter cake, wherein the filter press comprises a plurality of filter plates, each filter plate comprising a filter medium disposed thereon.

26. The method of claim 25, wherein steps (A), (B) and (C) are performed in the filter press.

27. The method of claim 25, wherein the inorganic nanowires are inorganic catalytic polycrystalline nanowires, the nanowires having a ratio of effective length to actual length of less than one and an aspect ratio of greater than ten as measured by TEM in bright field mode at 5 keV.

28. The method of claim 25, wherein the inorganic nanowires have a ratio of effective length to actual length of substantially equal to one as measured by TEM in bright field mode at 5 keV.

29. The method of claim 25, wherein the filter medium comprises PES (polyethersulfone), cellulose, cellulose acetate, regenerated cellulose, polypropylene, a hydrophilic or hydrophobic fluoropolymer, glass fibers, fritted glass, polyester or metal mesh.

30. The method of claim 25, wherein the method further comprises feeding the suspension through the filter press at pressures ranging from 20 to 40 PSI.

31. The method of claim 25, wherein the solution comprising the dopant is allowed to contact the filter cake for a period of time sufficient to incorporate the dopant into or on the surface of the inorganic nanowires.

* * * * *